US006748077B2

(12) United States Patent
Ford

(10) Patent No.: US 6,748,077 B2
(45) Date of Patent: Jun. 8, 2004

(54) STATION INTERFACE AND PROTECTOR WITH BUILT IN REDUNDANCY

(76) Inventor: Aaron S. Ford, 242 Cornwell Dr., Bear, DE (US) 19701

(*) Notice: Subject to any disclaimer, the term of this patent is extended or adjusted under 35 U.S.C. 154(b) by 10 days.

(21) Appl. No.: 10/108,209
(22) Filed: Mar. 26, 2002
(65) Prior Publication Data
US 2003/0185386 A1 Oct. 2, 2003

(51) Int. Cl.[7] .................................................. H04M 9/08
(52) U.S. Cl. .................................... 379/412; 379/413.02
(58) Field of Search ...................... 379/413.02, 413.03, 379/8, 9, 9.06, 412, 399.01

(56) References Cited

U.S. PATENT DOCUMENTS 5,132,867 A * 7/1992 Klancher ..................... 361/62

* cited by examiner

Primary Examiner—Forester W. Isen
Assistant Examiner—Jefferey Harold
(74) Attorney, Agent, or Firm—RatnerPrestia

(57) ABSTRACT

A replaceable plug which provides voltage surge protector redundancy for use in a maintenance termination unit connecting a telephone company line to a subscriber telephone line. The plug includes connecting terminals for connecting input and output telephone lines to a switch within the plug, and a pair of surge protector circuits. The switch is wired so that it selectively connects one or another of two surge protectors between the input and output lines replacing an actuated protector with a back up protector and restoring telephone service to the subscriber. Associated with this device is a method of determining whether a telephone line fault is due to a protector actuation or in the line proper, and for restoring telephone service without having to send a service person to the location of the maintenance termination box, by providing surge protector redundancy and a switching arrangement whereby a protector is replaced in the line circuit by a switching action.

11 Claims, 3 Drawing Sheets

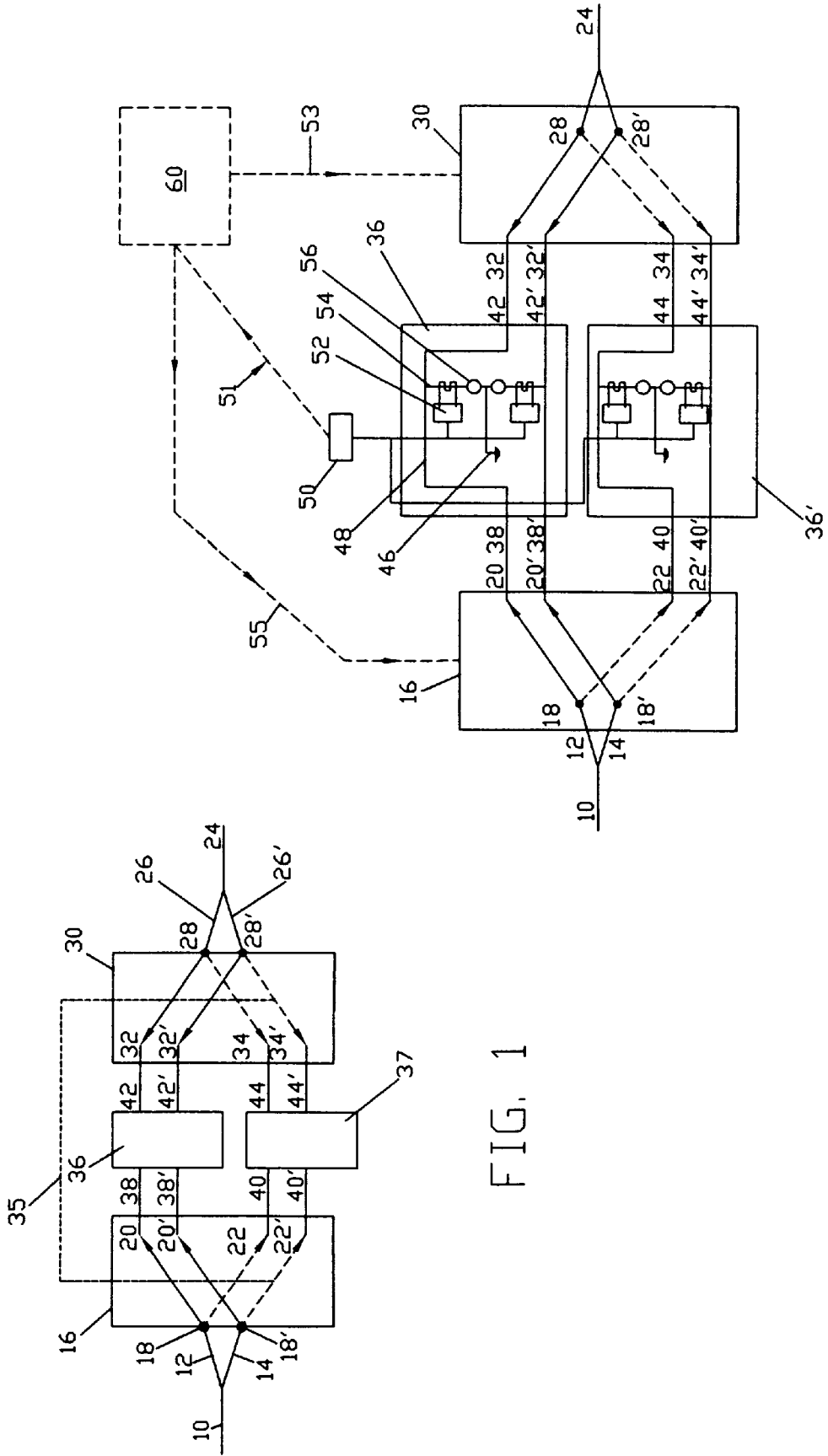

STATION INTERFACE AND PROTECTOR WITH BUILT IN REDUNDANCY

BACKGROUND OF THE INVENTION

This invention relates to telephone maintenance termination units having a line protector, and more particularly to a method and associated redundant protector actuation circuitry for use with a telephone maintenance termination unit, to provide convenient and rapid re-establishment of telephone communications.

A telephone system may be viewed as comprising the following three distinct parts:

(a) the telephone company system comprising at least one pair of wires for connecting with a subscriber system, (b) the subscriber system comprising at least one pair of wires connected to the subscriber telephone and (c) an interface between the company system and the subscriber system for connecting the telephone company wires to the subscriber wires, known as a maintenance termination unit.

With the advent of the breakup of the single telephone company individual subscribers are permitted to connect their own independently purchased telephones to the incoming telephone lines. The term "line" is used to designate a pair of electrically conductive wires.

In order to minimize tampering, and to permit easy connectivity between the subscriber system and the telephone company lines there have been developed maintenance termination units, such as the one described in U.S. Pat. No. 4,979,209. U.S. Pat. No. 4,979,209 (hereinafter the Collins et al. patent) is incorporated herein by reference as it provides a good description of a typical such interface commonly used in the trade. As described in the Collins et al. patent a typical maintenance termination unit includes an individual subscriber line module which includes a generally rectangular, box-like structure including a top, bottom, opposed sides and opposed first and second ends. An individual subscriber line maintenance termination unit is usually provided with a security cover mounted pivotally on one end of the top of the box-like structure which can be locked to limit access to the interior of the box.

In the box-like structure internal space there is at least one individual subscriber circuit comprising at least one pair of subscriber line wiring terminals for connection to the subscriber line, a plug connected to the pair of subscriber wiring terminals, and second electrical connectors for connecting the plug to the incoming telephone company line. The plug is plugged in a socket to interconnect the pair of subscriber wiring terminals and thereby the subscriber line to the incoming telephone company line. Thus the plug provides a demarcation point between the subscriber line and incoming telephone company line. By unplugging the plug from the socket of an operating telephone system one may quickly determine whether a fault exists on the subscriber line or the incoming telephone company line.

In order to provide protection to the telephone system and the subscriber equipment against unwanted and unexpected surge voltages, there have also been developed surge protectors for use with telephone lines. U.S. Pat. Nos. 4,624,514, and 4,447,848 describe such surge protectors Thus, for each line within the maintenance termination unit there is further included within the box-like structure a removable surge protector. Typically the surge protector is placed between the plug and the incoming telephone line. Surge protectors serve to divert a high voltage appearing in the incoming line from traveling to the subscriber equipment. Typically this is done by diverting the high voltage to ground through some switching system that connects the line to ground when a higher than desired voltage appears on the line. Thus, if a surge protector has been activated there is usually a short to ground in the line between the telephone company and the subscriber. However, the location of such short in the line is not easy to determine from a remote location, because the short may not be the result of an activated surge protector and may be in the subscriber side of the line, the telephone company side of the line or in the activated surge protector.

Because of the presence of potentially dangerous voltages in the maintenance termination unit and the concern about unauthorized tampering with the telephone lines, access to the interior of the maintenance termination unit is preferably limited to authorized telephone company technicians. This in turn requires that a technician be dispatched to physically inspect the maintenance termination units and, if the problem is indeed the protector, replace it to restore the telephone service. This may not be convenient, as telephone interruption may occur at a time where a technician may not be available on short notice. On the other hand if the protector has not been activated dispatching the technician to inspect it is a waste of time and resources.

There is, therefore still need for a simple, safe and secure way for the telephone company to ascertain whether the suspected activated protector is indeed the problem and be able to restore service preferably without having to immediately dispatch a technician to the subscriber's location.

SUMMARY OF THE INVENTION

According to this invention there is provided a device for use in a maintenance termination unit, the device comprising:

(a) a pair of input line connectors for connecting to a first telephone line (b) a pair of output line connectors for connecting to a second telephone line;

(c) at least one pair of first protector connectors for connecting to a first protector circuit;

(d) at least a pair of second protector connectors for connecting to a second protector circuit; and (e) a switch for selectably routing an electrical signal appearing at said input line connectors to said at least one pair of output connectors through a selected one of said first and second protector circuits.

The device may be housed in a casing designed as a replaceable plug adapted to fit within a socket in a typical maintenance termination unit. There is thus also provided according to the present invention, a maintenance termination unit comprising:

(a) at least one input line connector;

(b) at least one output line connector;

(c) at least two independent surge protectors; and (d) a switch connected to said at least one input line, said at least one output lines and said at least two independent surge protectors for selectably routing an electrical signal appearing at said at least one input line connector to said at least one output line connector through a selected one of said at least two independent surge protectors.

The switch may be an electronic switch and switching may be accomplished using a detector circuit to detect a surge voltage activation of the protector circuit and a control circuit to generate a signal indicative of the protector activation. The signal may be used to provide a visual indication or may be used to automatically disengage the first protector from the line and engage the second protector restoring service.

Finally there is also provided according to this invention a method for replacing a first protector circuit connected between an input and an output line pair in a maintenance termination unit, the method comprising:

(a) providing a second protector circuit;

(b) connecting a first switch between said input line pair and said first and second protector circuits;

(c) connecting a second switch between said first and second protector circuits and said output line pair; and (d) switching both switches and connecting one of said first and second protector circuits between said input and said output line pairs.

BRIEF DESCRIPTION OF THE DRAWINGS

FIG. 1 is a circuit diagram illustrating the present invention.

FIG. 2 is a circuit diagram illustrating an alternate embodiment of the present invention.

DETAILED DESCRIPTION OF THE INVENTION

Figure 3:
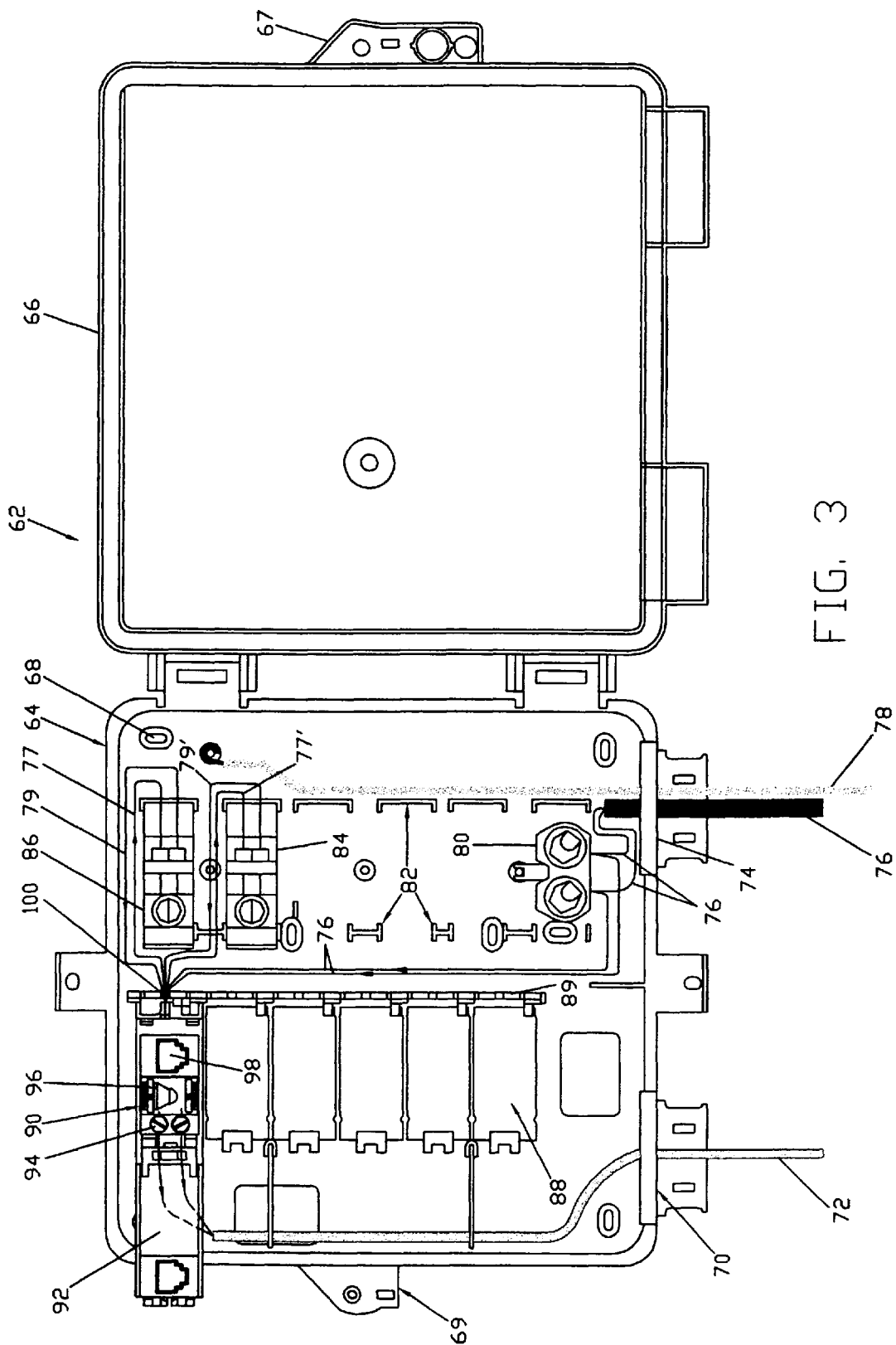
FIG. 3 is a schematic representation of a typical maintenance termination unit showing the placement of components in accordance with one embodiment of this invention.

The invention will next be described with reference to the figures. Same elements are identified using same numerals in all figures. The figures serve to illustrate and explain the invention and are not intended to limit the invention to the structures shown, nor are they in scale or intended to serve as engineering construction drawings.

Referring next to FIG. 1 there is shown an electrical circuit depicting the present invention in its most elementary form. As is shown in FIG. 1 the incoming line 10 which connects the telephone company system to the subscriber system comprises two wires, 12 and 14. The incoming line 10 terminates to first switch 16. Switch 16 is a double pole double throw switch having incoming line input terminals 18 and 18' to which are connected wires 12 and 14 respectively. In one switching position incoming line 10 is connected to switch 16 output terminals 20 and 20'. In the second switch position incoming line 10 is disconnected from output terminals 20 and 20' and connected to output terminals 22 and 22'.

Also shown in FIG. 1 there is a subscriber line 24 comprising two wires 26 and 26'. Subscriber line 24 is connected to input terminals 28 and 28' of second switch 30. In one switching position subscriber line 24 is connected to switch 30 output terminals 32 and 32'. In the second switch position the subscriber line 24 is disconnected from output terminals 32 and 32' and connected to output terminals 34 and 34'.

Two surge protectors 36 and 37 are electrically connected between switches 16 and 30. The surge protectors may be of the type described in the aforementioned U.S. Pat. No. 4,624,514 the contents of which are incorporated herein by reference, or may be any other type of surge protector used in the trade for such application as surge protection.

Each of surge protectors 36 and 37 includes a line input side and a line output side for connection to the incoming and subscriber lines. The surge protector also typically includes a ground connection for connection to a ground line which is not illustrated to prevent unnecessary cluttering of the figure. The output terminals 20 and 20' of the first switch 16 are connected to surge protector 36 input terminals 38 and 38'. The output terminals 22 and 22' of switch 16 are connected to surge protector 37 input terminals 40 and 40'.

Similarly the output terminals 32 and 32' of second switch 30 are connected to surge protector 36 output terminals 42 and 42'. The output terminals 34 and 34' of switch 30 are connected to surge protector 37 output terminals 44 and 44'.

First and second switches 16 and 30 are operated preferably in tandem through a connection illustrated as dotted line 35. Thus when switch 16 is in its first position switch 30 is also in its first position and a signal appearing over incoming line 10 is directed through switch 16 to surge protector 36 and through surge protector 36 and switch 30 to the subscriber line 24, bypassing surge protector 37. When switches 16 and 30 are switched to the second position, a signal appearing over incoming line 10 is directed through switch 16 to surge protector 37 and through surge protector 37 and second switch 30 to the subscriber line 24, bypassing surge protector 36.

FIG. 1 shows two double pole double throw switches being used to direct signals from the incoming line to the subscriber line through one or the other of surge protectors 36 and 37. While such arrangement is sometimes preferred due to space limitations within the maintenance termination box, and particularly within the removable plug used in the sockets within the termination unit, switch availability and costs, the two individual switches may be replaced with a single four pole double throw switch.

In operation, when a telephone malfunction is detected, it is a simple matter for the subscriber to be directed to gain access to the maintenance termination unit and to flip the switches from one position to the other. If the operation restores the telephone connection the problem has been identified and service has been restored. A technician may then be dispatched at a convenient time to replace the activated surge protector restoring the full system to its full capacity.

In an alternate embodiment according to the present invention illustrated in FIG. 2 there is shown the same switching arrangement as in FIG. 1. However the circuit of FIG. 2 provides an indicator 50 which serves to indicate whether a surge protector has been activated. Such indicator may be a signal such as a red light on the removable plug. The light may be turned on by sensing a surge current flow in the ground path of the protectors. Detection of a current pulse in a line is well known technology. For example as shown in FIG. 2 the protector may comprise a ground path for each of the two wires of the telephone line. Such path is shown in FIG. 2 and may comprise a valve type device 56 which is connected to wire 48, and which breaks down when a surcharge appears on wire 48. Wire 48 connects connector 38 to connector 42 of the surge protector 36.

A detector 52 comprising for example a coil pick-up around line 54 will generate a pulse in the detector circuit which may be used to activate the indicator 50. However any of a number of detection schemes and equipment may be used, and the above illustration of a detector is only for illustration purposes and is not limiting as to the particular protector internal circuitry or the detection of the protector activation.

In yet an alternate embodiment of this invention, instead of an indicator 50, the detector 52 may provide over line 51 a signal to a controller 60 (shown using dotted lines in FIG. 2). The controller may be used to automatically switch switches 16 and 30 which may be electronic switches, from a first to a second position restoring service by sending a switch actuating signal over lines 53 and 55. The controller may also provide the telephone company with a preset signal indicating that one of the surge protectors was activated. Electronic switching technology is well known in the art as is technology that sends a preset telephone signal or message over a telephone line when a particular event is detected by a controller, and the particular technology used is not important in implementing the teachings of the present invention.

Because there are large number of maintenance termination boxes in use throughout the United States, it is desirable that the invention may be implemented in a package that may be easily used in retrofitting existing installations.

Figure 4:
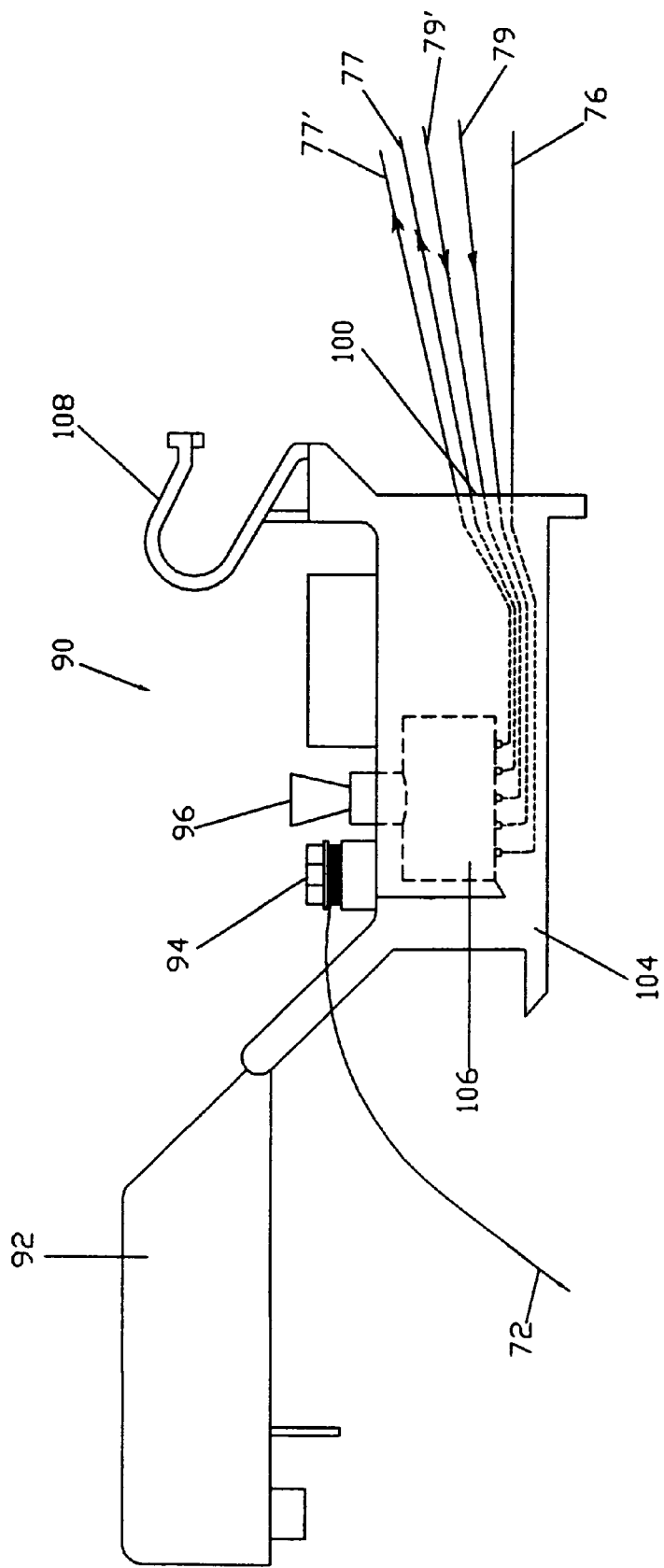
FIG. 4 is a schematic representation of a typical plug modified according to the present invention for use in the maintenance box illustrated in FIG. 3.

FIGS. 3 and 4 illustrate such a specific adaptation of the present invention in a package that can be installed in the typical maintenance termination box currently used in home and small business telephone service installations.

As shown in FIG. 3 a maintenance termination box 62 typically comprises a base enclosure 64 and a hinged cover 66 mounted on the base. The box may include a latch 69 which cooperates with a lock 67 on the lid to secure the lid in the closed position against accidental opening. The base includes a number of mounting holes 68 for securing the box on a convenient support.

Two wiring access ports 70 and 74 are shown for inserting the incoming line 76 and the subscriber line 72 to the interior of the box. Also shown is ground connection line 78 brought to the interior of the box. Typically there will also be present in such box a number of connection posts 80 where incoming line 76 is connected to.

Within the box there are provided a number of sockets 82 adapted to accept a surge protector. Two such surge protectors, 84 and 86 are illustrated. Also within the box are a number of plugs 88 in corresponding sockets 89, substantially as described in the aforementioned U.S. Pat. No. 4,979,209, modified in accordance to the present invention. Within the plug there is placed either a four pole double throw switch having an actuator 96 accessible from outside the plug, or two double pole double through switches in which case tandem actuators are preferably used. A telephone test jack 98, typically connected to the incoming line side of the switch, is also typically located in the plug for use by the subscriber and or the service personnel.

The plugs, shown in more detail in FIG. 4, preferably comprise a hinged cover 92 which protects circuit elements from accidental tampering. In the figures there is shown plug 90 with its cover 92 open. Under cover 92 are two connectors 94 to which is attached the subscriber line 72 and actuator 96. Incoming line 76 is connected to switch 106 within the plug in accordance with the circuit diagram shown in FIG. 1. Also in accordance with the same circuit diagram there are connected to switch 106 protectors 84 and 86. Thus the present invention may be retrofitted in existing equipment simply by placing a switch inside a standard plug and utilizing two standard protectors within the termination box without having to modify the termination box.

I have described my invention in terms of specific equipment. This is done by way of illustration rather than limitation. For example, in describing the switch used to implement my invention, I have used a mechanical switch. However electronic switches are also available, and present particular advantages for remote access and control. Such electronic switches are fully within the scope of my invention. I have also described one system for detecting whether a protector has been activated. Again this is done by way of illustration rather than limitation, and other systems, whether analog or digital are also within the scope of my invention, which

I claim:

1. A replaceable plug for use in a maintenance termination unit comprising a socket for accepting said plug, said plug comprising:

(a) at least one telephone input line connecting terminal;

(b) at least one subscriber output line connecting terminal;

(c) a first protector connecting terminals within said plug;

(d) a second protector connecting terminals within said plug;

(e) a switch in said plug connected to said at least one input line, said at least one output line and said at least first and second protector connecting terminals for selectably routing an electrical signal appearing at said input line to said at output line through a selected one of said first and second protector terminals when an external first and second protector circuits are connected to said first and second protector terminals, wherein at least one of said connecting terminals is integral with said switch.

2. A maintenance termination unit comprising:

(a) at least one input line connector;

(b) at least one output line connector;

(c) at least two independent surge protectors; and (d) a switch connected to said at least one input line, said at least one output lines and said at least two independent surge protectors for selectably routing an electrical signal appearing at said at least one input line connector to said at least one output line connector through a selected one of said at least two independent surge protectors wherein said switch for selectably routing an electrical signal appearing at said at least one pair of input line connectors to said at least one pair of output connectors comprises a first mechanical switch connected between said at least one pair of input line connectors and said two independent surge protectors and a second mechanical switch connected between said two independent surge protectors and said at least one pair of output connectors.

3. The maintenance termination unit according to claim 2 wherein each of said first and second switched comprises a single double pole double throw switch.

4. The maintenance termination unit according to claim 3 wherein said first and said second switch are mechanically connected so that both switch simultaneously.

5. A maintenance termination unit comprising:

(a) at least one input line connector;

(b) at least one output line connector;

(c) at least two independent surge protectors; and (d) a switch connected to said at least one input line, said at least one output lines and said at least two independent surge protectors for selectably routing an electrical signal appearing at said at least one input line connector to said at least one output line connector through a selected one of said at least two independent surge protectors wherein said switch for selectably routing an electrical signal appearing at said at least one pair of input line connectors to said at least one pair of output connectors comprises an electrical switch.

6. The maintenance termination unit according to claim 5 wherein said electronic switch is remotely actuated to route an electrical signal appearing at said at least one pair of input line connectors to said at least one pair of output line connectors through a selected one of said at least two protector circuits.

7. The maintenance termination unit according to claim 6 wherein said electronic switch is remotely actuated with a control signal appearing on said input connectors.

8. The maintenance termination unit according to claim 5 wherein said electronic switch further includes a sensing circuit for determining whether each of said protector circuits if functional and for connecting a functional protector circuit between said input and output connectors.

9. A method for replacing a first protector circuit connected between an input and an output line pair in a maintenance termination unit, the method comprising:

(a) providing a second protector circuit;

(b) connecting a first switch between said input line pair and said first and second protector circuits;

(c) connecting a second switch between said first and second protector circuits and said output line pair; and (d) switching both switches and connecting one of said first and second protector circuits between said input and said output line pairs wherein the step of switching said first and second switch is performed simultaneously.

10. The method according to claim 9 wherein the step of switching said first and second switch is performed manually.

11. The method according to claim 10 wherein the step of switching said first and said second is performed at the maintenance termination unit.

* * * * *